N. SPANOVIC.
STEERING MECHANISM FOR THREE WHEELED VEHICLES.
APPLICATION FILED FEB. 15, 1915. RENEWED MAR. 29, 1918.

1,283,942.  Patented Nov. 5, 1918.
2 SHEETS—SHEET 1.

Witnesses
Philip E. Barnes
M. L. Newcomb

Inventor
Ninko Spanovic
By Herman A. Phillips
Attorney

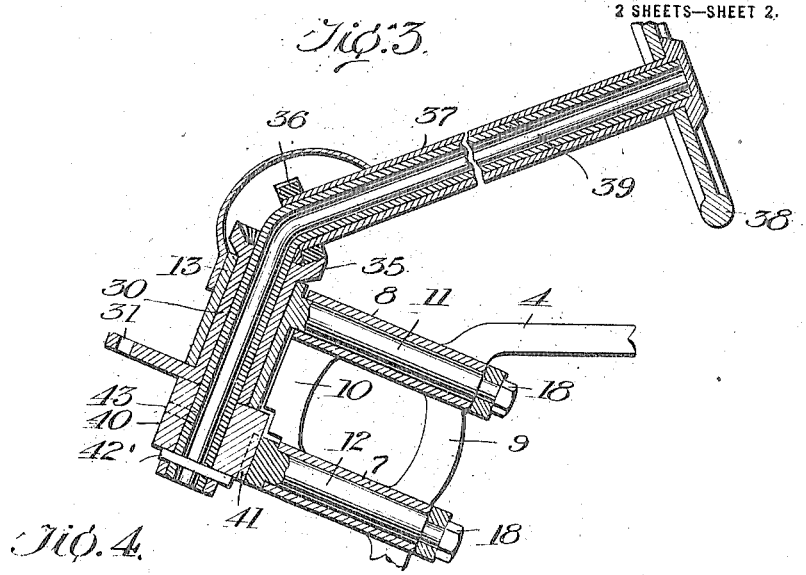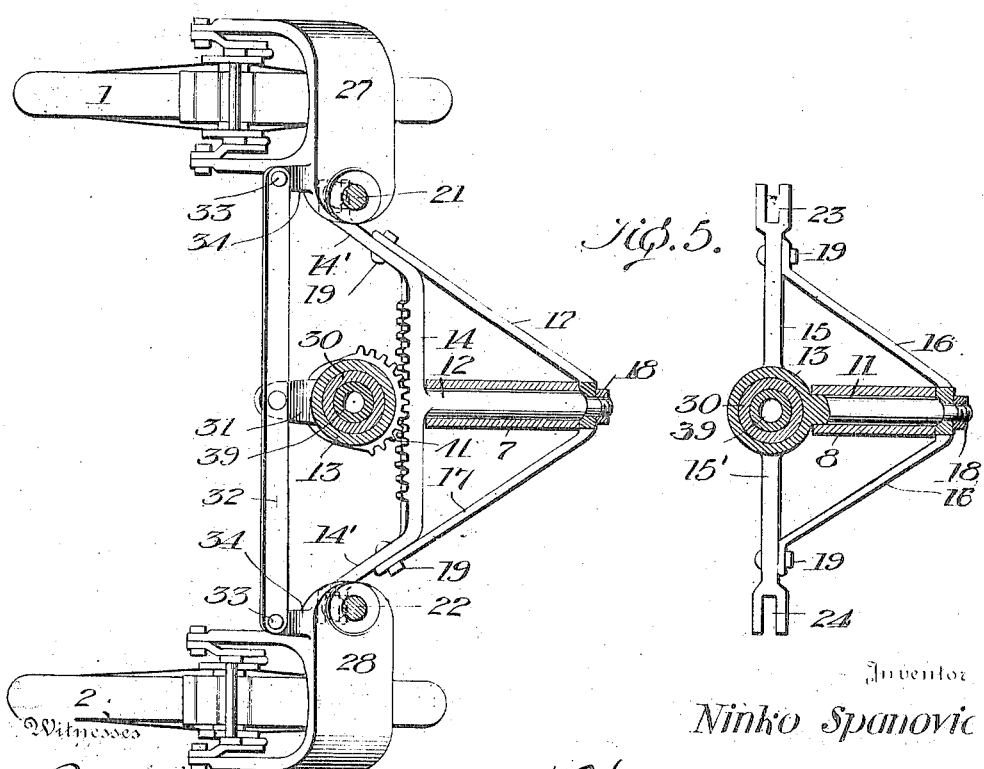

UNITED STATES PATENT OFFICE.

NINKO SPANOVIC, OF PITTSBURGH, PENNSYLVANIA.

STEERING MECHANISM FOR THREE-WHEELED VEHICLES.

1,283,942.　　　　　Specification of Letters Patent.　　Patented Nov. 5, 1918.

Application filed February 15, 1915, Serial No. 8,397.　Renewed March 29, 1918.　Serial No. 225,530.

*To all whom it may concern:*

Be it known that I, NINKO SPANOVIC, a citizen of the United States of America, residing at Pittsburgh, in the county of Allegheny and State of Pennsylvania, have invented certain new and useful Improvements in Steering Mechanism for Three-Wheeled Vehicles, of which the following is a specification.

The present invention relates to improvements in motor vehicles of the three-wheel motor cycle type, and is designed especially to provide means by which the vehicle may be tilted as a supplemental steering device to the usual mode of turning the steering wheels.

The primary object of the invention is to provide a supplemental steering means so that the vehicle may be made to turn corners with more facility and at a more rapid speed, and to turn sharper corners, than is attainable with the usual form of steering gear for this type of vehicles.

The invention consists essentially in certain novel combinations and arrangements of parts as will be hereinafter more fully described and claimed.

In the accompanying drawings I have illustrated one complete example of the physical embodiment of my invention constructed according to the best mode I have so far devised for the practical application of the principles of my invention.

Fig. 3 is an enlarged sectional view showing the steering post and the connections for tilting the body or frame of the vehicle.

Fig. 4 is a top plan view of the front wheels and forks, showing the steering mechanism partly in section.

Fig. 5 is a horizontal sectional view showing the upper tilting bar, a portion of the steering post and the upper stud axle for the tiltable frame.

Figure 1:
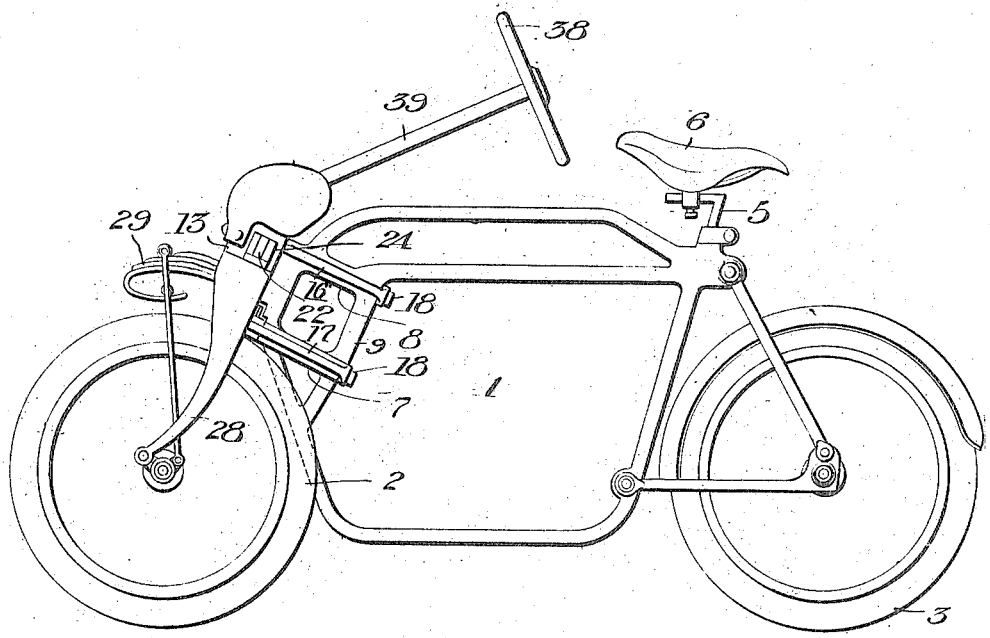
Figure 1 is an elevation of a three-wheeled vehicle constructed according to and embodying the novel features of my invention.

In the preferred embodiment of the invention as illustrated in the drawings the two front wheels 1 and 2, are the steering wheels and the rear wheel 3 is intended for the driving wheel, although no motor is illustrated herein it being understood that any suitable motor may be used, and the invention is confined to the vehicle as illustrated. The three wheels support the frame 4 which is equipped with the usual seat post 5 and seat 6. In general outline the frame 4 is of the usual motorcycle or bicycle type, but at its front it is formed with a pair of bearing sleeves 7 and 8 that are joined by the webs 9, 10. These two sleeves it will be seen decline to the rear from the horizontal, and are located at the extreme front of the frame to receive the respective stud shafts or axles 11, and 12, the former being integral with a cylindrical casing or tube 13, and the latter integral with and extending rearwardly at a right angle from the rack bar 14. In normal position these two shafts or axles 11 and 12 are directly in line, axle 12 directly under axle 11, and the casing 13 has a pair of arms 15—15' extending laterally therefrom forming a continuous transverse bar located above the rack bar 14. Each of these transverse bars is connected by its diagonally extending braces 16 and 17 with its respective axle 11 and 12 and the latter have their ends screw threaded for the retaining nuts 18. The braces are bolted to the transverse bars as at 19, and the upper and lower transverse tilting bars are thus reinforced with a special view to encountering rough or irregular roads or surfaces.

As best seen in Fig. 4 the transverse tilting rack bar 14 has its ends 14' 14' off set therefrom, and these ends are each formed with a knuckle 20 20 to which the lower ends of the pivot bars 21, 22, are pivoted. The upper ends of these bars are pivoted at 23 and 24 to the knuckles at the ends of the transverse bar 15, and the two transverse bars and pivot bars thus form a rectangular shaped tilting frame for the vehicle. At each end of this frame the pivot bars are incased in a sleeve or bearing tube as 25, 26, and these two bearing tubes are respectively integral portions of the wheel forks 27 and 28, to which the usual springs 29 are attached.

The usual type of steering apparatus comprises the sleeve or tube 30, within the casing 13, formed with the front perforated lug 31 to which the transverse steering rod 32 is pivoted, and the ends of this rod are pivoted at 33, 33, to the perforated ears 34, 34 integral with and projecting forwardly of the fork sleeves 25, 26.

At its upper end the tube 30 is flared and formed as a beveled toothed head or pinion 35 with which the wheel or gear 36 meshes. This gear 36 is fixed upon the rearwardly inclined steering post 37 to which is attached the steering wheel 38, and the post is supported on the bent hollow bar 39. The steering post is thus rotatable by means of the hand wheel over the bar 39, and when the wheel is turned to rotate the steering post about the then stationary bent bar 39, it will be seen that the front wheels 1 and 2 are turned either to the right or to the left through the connection between the gears 36, 35, sleeve 30, lug 31 and the steering rod 32 connected to the ears of the sleeves upon the wheel forks. In this manner the casing 13 becomes the head in which the parts are rotated.

In addition to the above described movement the steering post and its inclosed bar 39 may oscillate or swing horizontally about the front portion of the frame as a center. To this end the bent bar, at its lower extremity is provided with a collar 40, threaded or toothed at 41 to engage the rack teeth of the bar 14, and held on the bar 39 by means of the cotter or bolt 42' passed transversely through the bar as best seen in Fig. 3, and the pin 43 shown in dotted lines Fig. 3.

Figure 2:
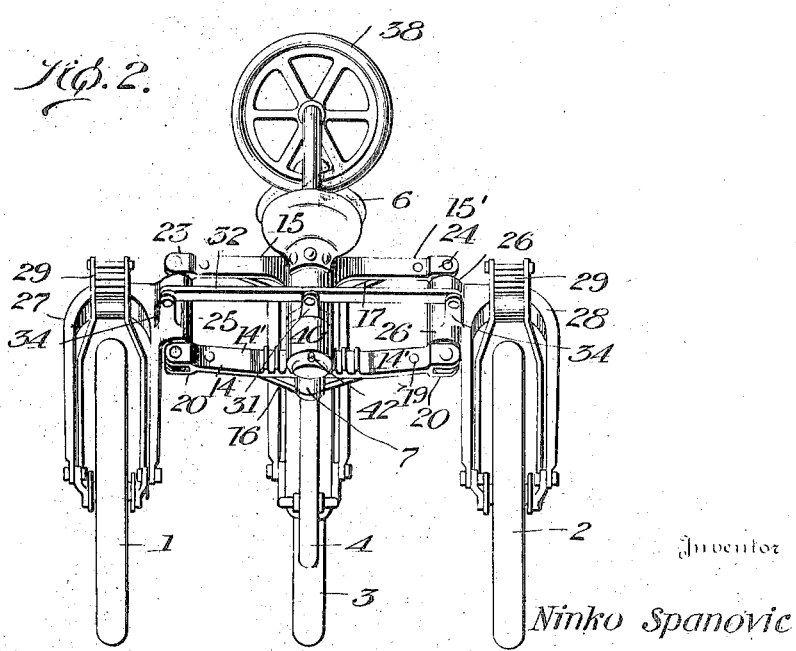
Fig. 2 is a front elevation of the machine, or vehicle.

Now when it is desired to tilt the vehicle assuming the rider to be in the seat 6 and grasping the wheel 38, the wheel, upper end of the bent bar, the steering post and sleeve 30 are swung to the right in Fig. 2. Under these conditions the sleeve 30 is stationary within the casing or head 13 and the collar 40 revolves with the lower end of the bent bar while the teeth 41 engage the teeth on rack bar 14 and the rack bar is moved to the right in Fig. 2. The two sleeves 7 and 8 are moved out of vertical alinement, the sleeve 7 swinging to the right and the sleeve 8 swinging to the left in Fig. 2 and the transverse bar 15 also swings to the left, and the rectangular frame composed of the two transverse bars 14 15 and 21, 22 is transformed into a rhomboid with the two bars 21 22 inclined to the vertical. Thus the two forks 27 and 28 are tilted, and with them the two wheels 1 and 2 are tilted. The rear wheel 3 is also tilted in the same direction, as it will be remembered that the frame 4 is tilted by the swinging out of alinement of the two shafts 11 and 12 in their bearing sleeves. This above described operation will tilt the motorcycle so that when approaching the observer it will turn to the observer's left.

In addition to the two separate and independent steering movements, i. e., turning of the wheel and tilting of the vehicle, both these movements may be accomplished at the same time by the simple action of swinging the post and turning the steering wheel simultaneously. Thus the rider may turn suddenly, as at a sharp corner, or by tilting the machine may take a curve at far greater speed than could be taken with the machine standing upright. The tilted machine, of course, is righted by a reverse movement of the parts as described.

From the above description taken in connection with my drawings it is evident that I have produced a machine that is capable of facile steering and tilting, and which will perform its functions in a most efficient manner.

What I claim is:—

1. The combination with a motorcycle having a pair of steering wheels and a frame, of forks for the wheels each having a bearing sleeve and a pivot bar therein, transverse bars pivotally mounted on the frame and connecting the ends of the pivot bars, and means for moving said transverse bars to tilt the wheels.

2. The combination in a wheeled vehicle having a pair of wheels and a frame and forks for the wheels each having a sleeve, a pivot bar in each sleeve, transverse tilting bars pivotally mounted on the frame and connecting the ends of the pivot bars one of which is formed with a rack, and a properly supported gear member engaging said rack to tilt the wheels and frame as described.

3. The combination in a wheeled vehicle including a pair of wheels and a frame and forks for the wheels each having a sleeve, a pivot bar in each sleeve, transverse tilting bars pivotally supported on the frame and connecting the ends of the pivot bars one of which is formed with a rack, a steering head rigidly connected with one of said transverse bars and having a bent steering bar, and a toothed member actuated by said steering bar to move the transverse rack bar to tilt said wheels and frame.

4. The combination in a vehicle having a pair of front wheels and a flexible frame made up of loosely jointed members supported thereby, a main frame pivotally connected to the flexible frame and a wheel supporting the main frame, and means for flexing the flexible frame to laterally tilt all the wheels and the main frame, as described.

5. The combination in a vehicle having a pair of wheels supporting a flexible frame made up of loosely jointed members between them, a pair of vertically alined shafts on the flexible frame, a main frame having pivot connection on these shafts and a support for the main frame, and means for flexing said flexible frame to tilt the wheels and main frame.

6. The combination in a vehicle with a pair of wheels and an intermediate flexible frame made up of loosely jointed members supported thereby, a main frame pivotally connected to the intermediate frame and a support for the main frame, and means for flexing the flexible frame to tilt the wheels and main frame.

7. The combination in a vehicle with a pair of wheels and an intermediate flexible frame made up of loosely jointed members supported thereby, a main frame pivotally connected to the flexible frame and a support for the main frame, and an oscillatable steering post fulcrumed in and operatively connected to the flexible frame for laterally tilting the wheels and main frame.

In testimony whereof I affix my signature in presence of two witnesses.

NINKO SPANOVIC.

Witnesses:
    ARNO J. VOIGT,
    JOSEPH P. ZINK.